G. R. RICHARDSON.
AUTOMATIC VALVE CONTROLLER.
APPLICATION FILED DEC. 9, 1916.
1,324,409.
Patented Dec. 9, 1919.
3 SHEETS—SHEET 3.
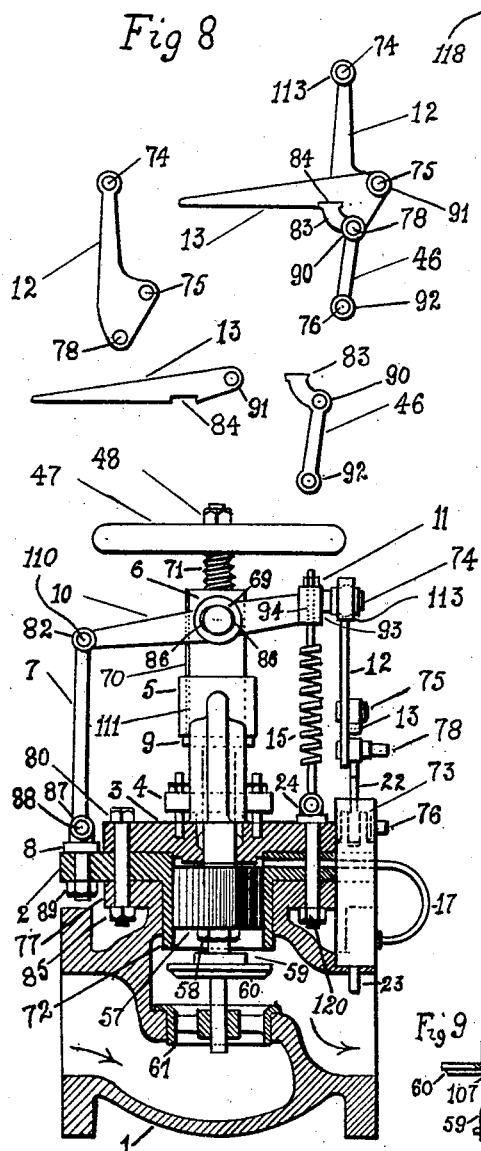
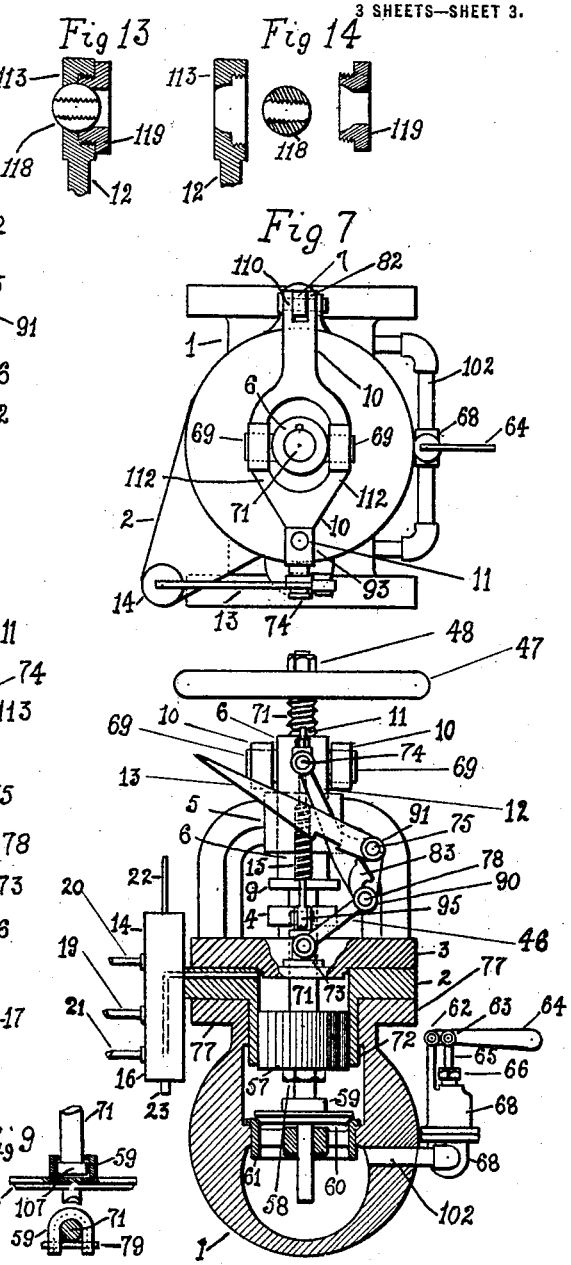
WITNESS:
INVENTOR.
George R. Richardson
BY
ATTORNEY.

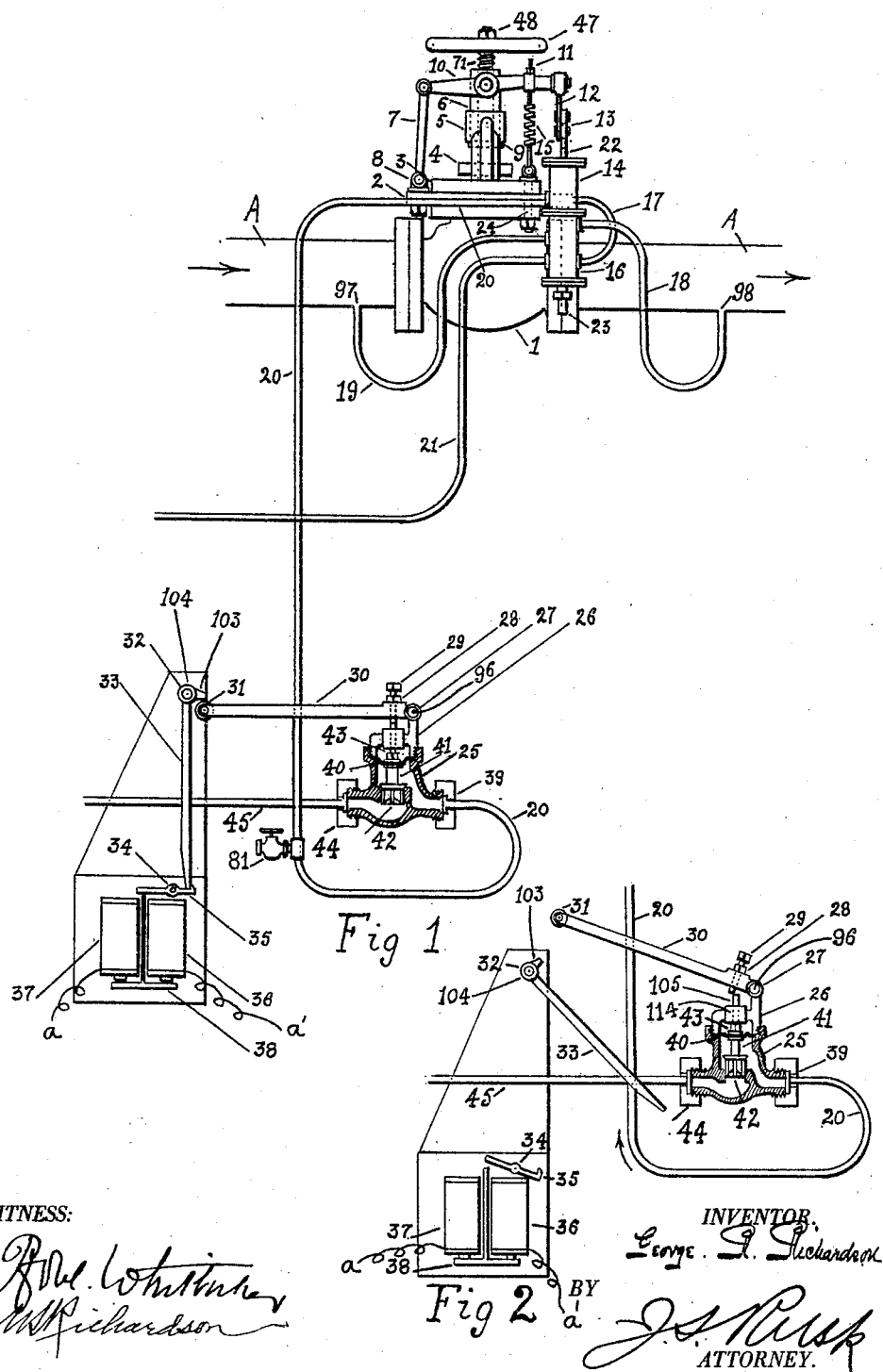

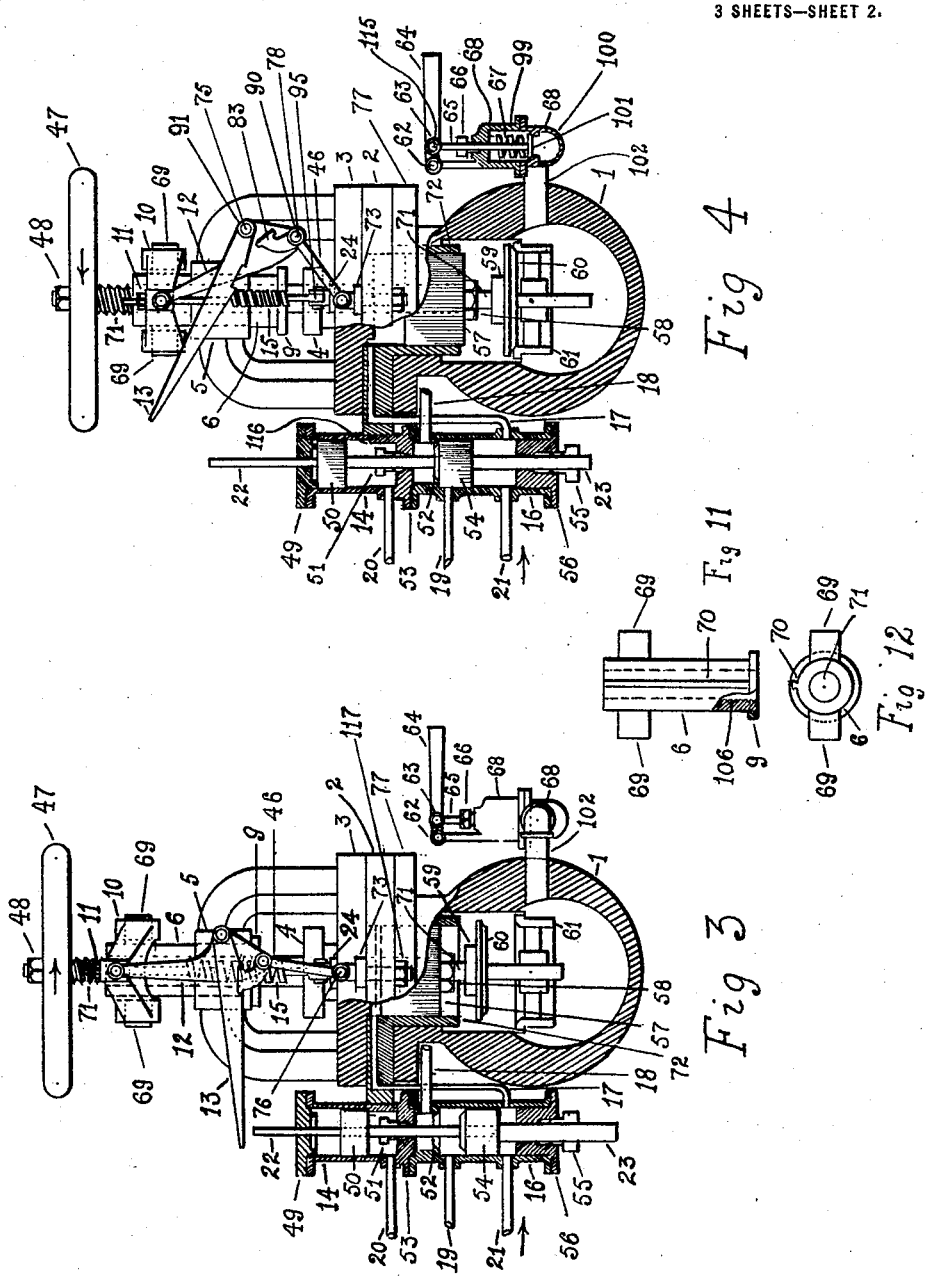

UNITED STATES PATENT OFFICE.

GEORGE R. RICHARDSON, OF BOSTON, MASSACHUSETTS.

AUTOMATIC VALVE-CONTROLLER.

1,324,409.  Specification of Letters Patent.  Patented Dec. 9, 1919.

Application filed December 9, 1916. Serial No. 136,010.

*To all whom it may concern:*

Be it known that I, GEORGE R. RICHARDSON, a subject of the Kingdom of Great Britain, and a resident of (Allston,) Boston, in the county of Suffolk and Commonwealth of Massachusetts, U. S. A., have invented certain new and useful Improvements in Automatic Valve-Controllers, of which the following is a specification.

The invention relates to improvements in fluid-pressure systems such as employ steam, compressed air, gas or other fluid for the operating medium that flows through a valve-controlled pipe-line from a source of supply to a place of utilization. The main object of the invention is to provide means that will automatically operate to close the valve in the pipe-line should there be a fall of pressure in the system on either side of the valve.

Another object of my invention is to provide mechanisms whereby the main controlling valve will remain and be held against movement until the pressure is established equally on opposite sides of said controlling valve.

Another object of my invention is to provide devices whereby at any time or from any point in the plant in which the apparatus may be located a suitable operating device may be manipulated to cause the automatic closing of the valve, and in such an emergency it is provided that the valve cannot be opened except by the actual manual operation of the valve itself. In other words, the valve is permanently closed when once operated to shut the main pipe line.

These and other objects are accomplished by the apparatus hereinafter shown and described and hereinafter particularly pointed out in the claims.

In the accompanying drawings which illustrate a construction embodying my invention:

Figure 1 is a side view in elevation of my improved automatic valve controller interposed in a pipe through which a fluid such as steam or compressed air or other fluid or gas under pressure circulates and also showing an arrangement of devices coöperating with said automatic valve when the apparatus is operated to meet an emergency.

Fig. 2 is a side elevation of the devices shown in the lower part of Fig. 1, and illustrating the positions the parts assume when the apparatus has been operated to meet an emergency at some point in the main pipe line, or to meet any emergency at some point under pressure, as for instance the reservoir.

Fig. 3 is a view partly in section and partly in elevation looking toward right hand end of the automatic valve controller and showing the controlling valve open to allow the free passage for the fluid or gas circulating under pressure through the main piping from a main reservoir in which the fluid such as steam, air, gas or other fluid under pressure is stored.

Fig. 4 is a similar view to Fig. 3 and showing the controlling valve closed to prevent the free passage for the fluid circulating under pressure through the main piping from a main reservoir in which the fluid such as steam, air or other fluid under pressure is stored.

Fig. 5 is a side elevation of the automatic valve controller with the lower portion in section and with the controlling valve open.

Fig. 6 is an end elevation of the automatic valve controller with the lower portion in section and looking at Fig. 5 from the right and showing the controlling valve closed.

Fig. 7 is a top plan view of the automatic controlling mechanism with the operating wheel omitted.

Fig. 8 is a detail view of the parts which when assembled form the lock for holding the controlling valve open and when operated due to emergency or breakage in the pipe line or for other reasons are actuated so as to release the controlling valve and allow it to close.

Figs. 9 and 10 are detail views in elevation and plan showing the connection of the valve stem to the main controlling valve.

Figs. 11 and 12 are detail views in side elevation and section, and plan showing the connection of the main controlling valve stem with the main controlling valve sliding nut.

Figs. 13 and 14 are sectional and detail views of the ball and socket joint hereinafter referred to.

Like letters of reference refer to like parts throughout the several views.

The main controlling valve 60 in the main pipe line A fits on a valve seat 61 in the valve casing 1 (Figs. 3, 4, 5 and 6) and cast on top of the main controlling valve 60 is a U-shaped recess 59 into which a collar 107 of the valve stem 71 is adapted to fit (Figs. 9 and 10) and to be held in lace by the pin 79. Above the main controlling valve 60 there is secured on the valve stem 71 a piston 57 by means of the nut 58 and this piston 57 is made a working fit in the cylinder 72. This cylinder 72 has a flanged upper end 2 which is fitted in place between the valve casing flange 77 and the main valve cover 3 and these parts 77, 2 and 3 are held together, pressure tight, by bolts 80 and nuts 85.

The valve stem 71 passes through the cover 3 and is kept tight by the stuffing box 4 and is threaded to work with the interior thread 106 of the nut 6. This nut 6 fits loosely in a cylindrical hole in the top of the yoke 5 and is free to move up and down with the valve stem 71 on which it may be adjusted by the screw threads above described and this nut 6 is kept from turning by the key 70 which fits in a corresponding keyway 111 in the yoke 5 (Fig. 5). This nut 6 has a threaded stop collar 9 (Figs. 3, 4 and 11) on its lower end and located between stuffing box 4 and the upper part of the yoke 5 (Figs. 5 and 6).

On each side of the nut 6 are the trunnions 69 located in the elliptical holes 86 in the branch arms 112 of the cross bar 10 and on one end of the cross bar 10 a pin 110 connects the lugs 82 of the cross bar 10 with the link 7. This link 7 has an eye 87 at its lower end which with a pin 88 engages the eye bolt 8 which passes through the flange 2 and is secured in place by the nut 89.

The opposite end of the cross bar 10 forms the threaded pin 74 which engages with an eye 113 in the top section of the slip link 12, (Figs. 5 and 8). On the threaded pin 74 the interior threads of the ball 118 (Figs. 13 and 14) are fitted and this ball 118 fits into the female curved surface of the eye 113 and in the female curved surface of the nut 119 with the threads of the nut 119 engaging the threads in the eye 113 and forming a ball and socket joint. In Fig. 13 there is shown the eye 113, ball 118 and nut 119 assembled on the upper end of the slip link 12 and adapted to prevent binding in the operation of the slip links 12 and 46.

On the lower end of the slip link 12 are two pins 75 and 78 and on the latter pin the eye 90 in the top end of the lower section of the slip link 46 fits and above the eye 90 in the link 46 and forming a part thereof is a pawl 83 which engages in the slot 84 in the catch 13.

The eye 91 on the catch 13 fits on the pin 75 of the slip link 12 and the eye 92 on the lower end of the link 46 engages the eye bolt 73 (Figs. 3 and 4) by the pin 76, the eye bolt 73 passing through the flange 2 and secured by nut 117 (Fig. 3).

Between the pin 74 on the end of the cross bar 10 (Fig. 5) and the valve stem 71 is a socket 93 and through this socket the threaded end 94 of the spring 15 passes, and by means of the nut 11 the tension of the spring 15 is adjusted. The lower end of the spring 15 is provided with an eye 95 which engages with the eye bolt 24 which passes through the cover 3, flanges 2 and 77 and is held securely in place by a nut 120.

The cross-bar 10, the links 7 and 46, and the slip-link 12 form a break-joint mechanism which is held in an extended position by the pawl 83 engaging the recess 84 in the catch 13. In its extended position the break-joint mechanism, through the intervening connections, holds the main valve 60 open against the action of the means normally operating to close the main valve. When the catch 13 is disengaged from the pawl 83 the break-joint mechanism collapses and permits the closing of the main valve by the closing means.

Directly under the center and near the swinging end of the catch 13 (Figs. 3 and 4) is the center of the piston rod 22 which passes through the upper cylinder head 49 into the cylinder 14 and is fastened to the piston 50. This rod then passes through the stuffing box 51 through the lower head 53 of the cylinder 14 and into the cylinder 16 where it is made fast to the piston 54 and thence through the bottom cylinder head 56 and stuffing box 55 located below the cylinder 16. This piston rod 22 is enlarged in diameter at 23 which part 23 passes through the bottom cylinder 56 and through the stuffing box 55 (Figs. 3 and 4).

The top section of the piston 54 is beveled and forms a valve face which fits tightly on the valve seat 52 in the cylinder 16. The lower section of the bore of the cylinder 14 under the piston 50 is smaller in diameter than the piston 50 and forms a shoulder 116 on which the piston 50 rests clear of the stuffing box nut 51. Into the side of the cylinder 14 and below the piston 50 one end of the pipe 20 is fitted and the other end of the pipe 20 is made fast and tight to the emergency valve casing 25 (Figs. 1 and 2) by the nut 39 and this pipe 20 is connected to the space in the valve casing 25 above the valve 42. Connected to the valve 42 is a valve stem 41, the upper end of which is reduced in diameter as shown at 105. This reduced end of the valve stem 41 passes through the diaphragm 40 and is kept tight by the nut and washer 43. This diaphragm 40 also forms a tight joint between the faces of the valve casing 25 and the valve cover 26. The lower end of the valve cover 26 is threaded and is screwed into the thread in the upper part of the valve casing 25 making a tight joint, and this valve stem 41 passes through a guide 114 in the valve cover 26 and the distance between the valve cover 26 and the nut 43 limits the lift of the valve 42.

The arm 30 has a pin 96 in one end which engages the eye 27 bored on the upper end of the valve cover 26 and at the other end of the arm 30 is a roll 31. Between the eye 27 and the roll 31 a screw threaded adjustable bolt 29 engages a thread in the arm 30 and this bolt 29 rests squarely on the reduced end 105 of the valve stem 41 (Figs. 1 and 2) of the valve 42 and a lock nut 28 prevents the bolt 29 from turning.

On the roll 31 the short arm 103 of the lever 33 rests and the lever 33 has an eye 104 which engages the fulcrum pin 32, and at the other end of the lever 33 the gib of the catch 35, held in place by the fulcrum pin 34, holds the valve 42, arm 30 and lever 33 in position when the valve 42 is closed, as shown in Fig. 1.

Immediately under the center and near the straight end of the catch 35 is the armature 38 which is raised by the magnets 36 and 37 when the same are magnetized by electric power through the wires $a$ $a'$. The pipe 45 is connected to the valve casing 25 and is secured in place by the nut 44 at one end and at the other end pipe 45 is connected to a main pressure reservoir containing a fluid, as a gas or other medium adapted for use to which the apparatus may be put.

The main valve casing 1 is connected by the main pipe line A to the same pressure reservoir and the main controlling valve, with the parts shown in Fig. 1, is open as shown in Figs. 3 and 5, so that the circulating medium flows from the reservoir through the main pipe line A, through the automatic valve controller, the valve 60 being open, and on through the main pipe line to the place of use, and this position of the parts continues as long as the pressure on the opposite sides of the automatic valve controller and adjacent to said valve remains equalized.

When any individual switch, of the many emergency switches which are placed in position in a building, a factory or office in a suitable inclosing box, is closed the electric power through the wires $a$ $a'$ magnetizes the magnets 36 and 37 which raise the armature 38 which releases (Fig. 2) the catch 35 from the lever 33 so that the arm 30 swinging freely upward permits the valve 42 to open whereupon pressure from the main reservoir is transmitted through the piping 45 through the open valve 42 into the pipe 20 through which the pressure passes under the piston 50 (Fig. 3) thereby raising the piston 50 and with the piston 50 its piston rod 22 (Fig. 4).

This piston rod 22 releases the catch 13 (Figs. 3 and 4) and the slip link sections 12 and 46 fall clear of one another and the tension of the spring 15 acting on the cross bar 10 and pressing on the opposite trunnions 69—69 thrusts down the nut 6, valve stem 71, piston 57 and the main controlling valve to its valve seat 61 thereby closing the main controlling valve 60 as shown in Figs. 4 and 6.

At a point above the top of the piston 54 when in its normal position (Figs. 3 and 4) and below the valve seat 52 a pipe 19 is fitted into the wall of the cylinder 16. The other end of the pipe 19 is fitted into the main pipe line A at 97 (Fig. 1) on the inlet side of the valve 60. Above the valve seat 52 (Figs. 3 and 4) the pipe 18 is fitted into the wall of the cylinder 16, and the opposite end of this pipe 18 is fitted into the main pipe line A at 98 on the discharge side of the main controlling valve 60 (Fig. 1). Below the piston 54 the pipe 21 is fitted (Figs. 3 and 4) into the wall of the cylinder 16 and the opposite end of this pipe 21 enters the main pressure reservoir above referred to.

The pipe 17 is fitted in the wall of the cylinder 16 (Figs. 3, 4 and 5) under the piston 54 at one end and is connected to the space between the piston 57 and the main valve cover 3. When the pistons 50 and 54 are in their highest positions (Fig. 4), and at their lowest positions (Fig. 3), there is direct communication through the pipes 17 and 21 between the main pressure reservoir and the space between the piston 57 and the valve cover 3.

When the main valve 60 (Figs. 1, 3 and 5) is open and the main pipe line A on each side of the valve 60 is under pressure from the main pressure reservoir and so long as this condition of equal pressure on opposite sides of the valve 60 exists the main controlling valve 60 remains open.

In the event of the pressure in the main pipe line A dropping on either side of the main controlling valve 60 through either of the pipes 18 or 19, the pressure would be released above the piston 54 (Fig. 3) in the cylinder 16 and the pressure in the pipe 21 and under the piston 54 raises this piston 54 with its piston rod 22 (Fig. 4) and this piston rod in lifting releases the catch 13 with a consequent seating of the main valve 60 as above described. The pressure from the main pressure reservoir always being in communication through the pipes 21 and 17 with the space between the piston 57 and the valve cover 3 assists the spring 15 to seat the main controlling valve 60 and keep it tight.

When the pressure above the piston 54 is reduced the top of the piston 54 (Fig. 3) forming a valve, the piston moves up (Fig. 4) and fits tightly on the valve seat 52, closing the end of the pipe 19.

This operation of the parts above referred to prevents the catch 13 from being engaged with the slip link sections 12 and 46 until the pressure is equalized above the piston 54 through the pipe 18. To equalize the pressure on the two sides of the main valve 60, the valve 68 (Figs. 3 and 4) in the by-pass 102 (Fig. 7) which connects the inlet side with the discharge side of the main controlling valve 60 is opened.

This valve 68 is a globe pattern valve and the pressure enters the valve casing 100 above the valve disk 101. This valve disk 101 is connected to the valve stem 65 (Fig. 4) which passes through the stuffing box 66. On the outer end of the valve stem 65 a pin 115 engages an eye 63 on the handle 64 and the extreme rear end of the handle 64 is pivoted at 62 on the upper end of the valve casing 99. A spring 67 between the valve casing and the valve disk 101 keeps the valve 68 closed on its seat.

Supposing the main valve 60 to be closed, in order to open the by-pass valve 68, the lever 64 must be operated by hand against the pressure.

When the pressure on each side of the main controlling valve 60 has been equalized this main valve 60 can then, and only then, be opened. This opening is accomplished in the following manner: the pressure being equalized above and below the piston 54 and the effective area above the piston 54 being slightly in excess of the area below the piston 54 owing to the difference in diameter of the piston rods 22 and 23 (the piston 54 and the piston rods 22 and 23 are all connected) the piston rod 22 can be thrust down by hand. The stop collar 9 (Fig. 4) is brought up hard to the bottom of the yoke 5 by turning the valve wheel 47, in the direction of the arrow (Fig. 4), for closing the main valve 60 and increasing the tension on the spring 15. The slip link sections 12 and 46 are brought to an upright position and the catch 13 is engaged by the pawl 83 fitting into the recess 84 of the catch 13 (Fig. 3). The rotation of the wheel 47 is then reversed, in the direction indicated by the arrow, (Fig. 3) and lifts the valve stem 71, piston 57 and opening the main controlling valve 60 (Fig. 3).

The manner in which the main valve 60 is opened when it has been closed by the emergency valve 25 is the same, but after the emergency valve 25 has been closed, as shown in Fig. 1, the pressure in the pipe 20 is released by opening the drain cock 81 (Fig. 1) and when the pistons 50 and 54 are in their lowest positions, the drain cock 81 is then closed.

The above description is given of one main controlling valve having its inlet from a main pressure reservoir and its discharge connected to another pressure reservoir or motor. The main valve may be used in multiple, from and to various reservoirs or from several reservoirs to one or more motors. The pressure may enter the main controlling valve casing 1 either above or below the main controlling valve 60, and in this embodiment of my invention, I have shown it entering the valve casing 1 from below. The inlet end of the pipe 45, emergency valve 42 and the pipe 21 below the piston 54 can be connected to any independent pressure source.

Having thus described the nature of my invention and set forth a construction embodying the same, what I claim as new and desire to secure by Letters Patent of the United States, is:

1. In a fluid pressure system, a pipe-line to conduct the pressure fluid, a controlling valve for the passage through the pipe-line, a closing means for said valve, a holding mechanism for normally retaining said valve open against the action of said closing means, and an automatically operating releasing means for said holding mechanism, said releasing means being retained in non-operating position by pressure from the pipe-line on both sides of said controlling valve, and when moved to operative position closing the communication between the opposite sides of the pipe-line, the pressure from the pipe-line being exerted only on one side of the automatically operating releasing means.

2. In a fluid pressure system, a pipe-line to conduct the pressure fluid, a controlling valve for the passage through the pipe-line, a closing means for said valve, a holding mechanism for normally retaining said valve open against the action of said closing means, and an automatically operating releasing means for said holding mechanism, said releasing means being retained in non-operating position by pressure from the pipe-line on both sides of said controlling valve, and when moved to operative position closing the communication between the opposite sides of the pipe-line, the pressure from the pipe-line being exerted only on one side of the automatically operating releasing means, and said automatically operating releasing means having a constant fluid pressure on its opposite side supplied from a source other than from said pipe-line.

3. In a fluid pressure system, a pipe-line to conduct the pressure fluid, a controlling valve for the passage through the pipe-line, a closing means for said valve, a holding mechanism for normally retaining said closing valve open against the action of said closing means, an automatically operating releasing means for said holding mechanism, said releasing means being retained in non-operating position by pressure from the pipe line on both sides of said controlling valve, this pipe-line pressure being exerted only on one side of the automatically operating releasing means, said releasing means having a constant fluid pressure on its opposite side supplied from a source other than from said pipe-line, and means for supplying a constant fluid pressure to said controlling valve to coöperate with said closing means to close the valve and retain it in a closed position until equal pressure is established on both sides of the controlling valve.

4. In a fluid-pressure system, a pipe-line to conduct the pressure fluid, a valve to control the passage through the pipe-line, means normally operating to close the valve, mechanism normally holding the valve open against the action of the closing means, a cylinder containing a piston communicating at one end with a constant supply of pressure in the system and said cylinder communicating at its other end with the pressure in the system on both the pressure and discharge sides of the valve so that a fall of pressure in the system on either side of the valve will unbalance the pressure at the opposite ends of the piston to move the latter to operative position and close the communication between the opposite sides of the pipe-line, and mechanism operated by the movement of the piston to release the holding mechanism from the valve to permit the closing of the valve by the closing means.

5. In a fluid pressure system, a pipe-line to conduct the pressure fluid, a controlling valve for the passage through the pipe-line, a constant pressure closing means for said valve, a holding mechanism for normally retaining said valve open against the action of said closing means, and an automatically operating releasing means for said holding mechanism, said releasing means being retained in non-operating position by pressure from the pipe-line on both sides of said controlling valve, and when moved to operative position closing the communication between the opposite sides of the pipe-line, the pressure from the pipe-line being exerted only on one side of the releasing means.

6. In a fluid-pressure system, a main pipe-line to conduct the pressure fluid, a main valve to control the passage through the main pipe-line, means normally acting to close the main valve, mechanism normally holding the main valve open against the action of the closing means, a cylinder containing a piston communicating at one end with a constant supply of pressure from the system and communicating at its other end with the main pipe-line on both sides of the main valve so that a fall in pressure in the main pipe-line on either side of the main valve will unbalance the pressure in such cylinder to move the piston therein, a second cylinder containing a piston receiving pressure through a supply pipe apart from the main pipe-line to move the piston therein, a secondary valve normally closing the supply pipe, means controlled from a distant point for opening the secondary valve, and mechanism operated by the movement of either piston for releasing the main valve-holding mechanism to permit the closing of the main valve by the latter's closing means.

7. In a fluid pressure system, a pipe-line to conduct the pressure fluid, a controlling valve for the passage through the pipe-line, a closing means for said valve, a holding mechanism for normally retaining said valve open against the action of the closing means, an automatically operating releasing means for said holding mechanism, said releasing means being retained in non-operating position by pressure from the pipe-line on both sides of said controlling valve, the pressure from the pipe-line being exerted only on one side of the releasing means, and a supplemental means carried by the releasing means for operating the same to release the holding mechanism, said supplemental means being operable by fluid pressure manually controlled at a distance from said valve.

8. In a fluid-pressure system, a pipe-line to conduct the pressure fluid, a valve-casing interposed in the pipe-line, a valve to close the port in the valve-casing, a screw-threaded stem carrying the valve, means for turning the stem, a non-rotatable nut engaging the stem, a bar pivotally mounted at one end on the valve-casing and carrying the non-rotatable nut, a spring normally pressing the pivoted bar toward the valve-casing, a slip-joint link in its extended position holding the free end of the bar against the action of the spring, and mechanism actuated by a fall of pressure in the pipe-line on either side of the valve to break the slip-joint link to permit the spring to move the pivoted bar and intervening mechanism to close the valve against its seat in the valve-casing.

In testimony whereof, I have signed my name to this specification this 7th day of December, 1916.

GEORGE R. RICHARDSON.